(12) United States Patent
van de Beek et al.

(10) Patent No.: US 9,838,167 B2
(45) Date of Patent: Dec. 5, 2017

(54) METHOD AND SYSTEM FOR ALLOCATING COMMUNICATION RESOURCES

(71) Applicant: Huawei Technologies Co., Ltd., Shenzhen, Guangdong (CN)

(72) Inventors: Jaap van de Beek, Kista (SE); Oskar Mauritz, Johanneshov (SE); Branislav Popovic, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/444,594

(22) Filed: Jul. 28, 2014

(65) Prior Publication Data

US 2014/0334527 A1    Nov. 13, 2014

Related U.S. Application Data

(63) Continuation of application No. 13/920,760, filed on Jun. 18, 2013, now Pat. No. 8,811,330, which is a (Continued)

(51) Int. Cl.
*H04W 72/08*     (2009.01)
*H04L 5/00*     (2006.01)
(Continued)

(52) U.S. Cl.
CPC .......... *H04L 5/0005* (2013.01); *H04B 1/713* (2013.01); *H04B 7/2615* (2013.01); *H04L 5/003* (2013.01);
(Continued)

(58) Field of Classification Search
None
See application file for complete search history.

(56) References Cited

U.S. PATENT DOCUMENTS

| 4,394,642 | A | | 7/1983 | Currie et al. |
| 6,064,662 | A | * | 5/2000 | Gitlin et al. ................. 370/330 |

(Continued)

FOREIGN PATENT DOCUMENTS

| CN | 1387707 A | 12/2002 |
| CN | 1419789 A | 5/2003 |

(Continued)

OTHER PUBLICATIONS

Kaitz et al., "Changing the status of Subchannelization in OFDM mode," IEEE 802.16 Broadband Wireless Access Working Group, IEEE C802.16d-03/80, Institute of Electrical and Electronics Engineers, New York, New York (Nov. 13, 2003).
(Continued)

*Primary Examiner* — Alex Skripnikov
(74) *Attorney, Agent, or Firm* — Leydig, Voit & Mayer, Ltd.

(57) ABSTRACT

The present invention relates to a method for allocating communication resources in a multi-user cellular communication system, wherein communication resources are divided in time periods and frequency sub-bands, wherein part of the communication resources are used for frequency-localized communication channels, and part of the communication resources are used for frequency distributed channels. The method further comprises the steps of: classifying part of the frequency sub-bands as frequency sub-bands carrying frequency-distributed channels, classifying the remaining part of the frequency sub-bands as frequency sub-bands carrying frequency-localized channels. The present invention also relates to a system, a transmitter and a communication system.

19 Claims, 4 Drawing Sheets

Related U.S. Application Data continuation of application No. 11/955,895, filed on Dec. 13, 2007, now Pat. No. 8,488,531, which is a continuation of application No. PCT/CN2005/000857, filed on Jun. 15, 2005.

(51) Int. Cl.
*H04B 7/26* (2006.01)
*H04B 1/713* (2011.01)
*H04W 72/04* (2009.01)

(52) U.S. Cl.
CPC .......... *H04L 5/0039* (2013.01); *H04L 5/0041* (2013.01); *H04W 72/042* (2013.01); *H04W 72/085* (2013.01); *H04B 2201/713* (2013.01); *H04L 5/0012* (2013.01); *H04L 5/0082* (2013.01); *H04L 5/0094* (2013.01)

(56) References Cited

U.S. PATENT DOCUMENTS

| | | | |
|---|---|---|---|
| 6,223,048 B1 | 4/2001 | Noll et al. | |
| 6,819,930 B1 | 11/2004 | Laroia et al. | |
| 7,146,172 B2 | 12/2006 | Li et al. | |
| 7,245,920 B2* | 7/2007 | Laroia et al. | 455/450 |
| 7,406,058 B2* | 7/2008 | Laroia et al. | 370/328 |
| 7,539,496 B1 | 5/2009 | Sousa et al. | |
| 8,077,692 B2* | 12/2011 | Khandekar | H04L 5/0007 370/208 |
| 8,488,531 B2* | 7/2013 | Van De Beek et al. | 370/329 |
| 2002/0176398 A1 | 11/2002 | Nidda | |
| 2003/0202492 A1 | 10/2003 | Akella et al. | |
| 2003/0231715 A1 | 12/2003 | Shoemake et al. | |
| 2004/0136393 A1* | 7/2004 | Insua | H04B 3/54 370/432 |
| 2004/0165547 A1* | 8/2004 | Lopes | H04W 16/00 370/328 |
| 2004/0174808 A1 | 9/2004 | Bolinth et al. | |
| 2004/0190640 A1* | 9/2004 | Dubuc et al. | 375/260 |
| 2005/0069022 A1 | 3/2005 | Agrawal | |
| 2005/0180374 A1* | 8/2005 | Balachandran et al. | 370/343 |
| 2005/0238108 A1 | 10/2005 | Suh et al. | |
| 2006/0209669 A1 | 9/2006 | Nishio | |
| 2006/0233124 A1* | 10/2006 | Palanki | H04B 1/7143 370/319 |
| 2007/0127359 A1 | 6/2007 | Ahn et al. | |
| 2013/0176965 A1 | 7/2013 | Murakami et al. | |

FOREIGN PATENT DOCUMENTS

| | | |
|---|---|---|
| CN | 1550080 A | 11/2004 |
| CN | 1853367 A | 10/2006 |
| CN | 101204100 B | 6/2008 |
| DE | 19755831 A1 | 7/1999 |
| EP | 0544463 A2 | 6/1993 |
| EP | 1045606 A2 | 4/2000 |
| EP | 1045606 A2 | 10/2000 |
| EP | 1204233 A1 | 5/2002 |
| EP | 1418776 A1 | 5/2004 |
| EP | 1422851 A1 | 5/2004 |
| EP | 1646170 A1 | 4/2006 |
| GB | 2318252 A * | 4/1998 |
| JP | H10163925 A | 6/1998 |
| JP | 2003152679 A | 5/2003 |
| JP | 2004274220 A | 9/2004 |
| KR | 20020063299 A | 8/2002 |
| KR | 20040033988 A | 4/2004 |
| KR | 20050048261 A | 5/2005 |
| WO | WO 0152436 A1 | 7/2001 |
| WO | WO 0225853 A2 | 3/2002 |
| WO | WO 02089436 A1 | 11/2002 |
| WO | WO 2004102816 A2 | 11/2004 |
| WO | WO 2005020488 A1 | 3/2005 |
| WO | WO 2005071437 A1 | 8/2005 |
| WO | WO 2005081437 A1 | 9/2005 |

OTHER PUBLICATIONS

<http://www.3gpp.org/ftp/tsg_ran/wg1_rl1/TSGR1 41/Docs/> (May 17, 2011).
<http://www.ieee802.org/16/tgd/contrib/> (May 17, 2011).
Mouly et al., "The GSM System for Mobile Communications," Cell & Sys. Correspondence (1992).
"Downlink Multiple Access for EUTRA," slides for discussion, 3GPP TSG RAN1#40bis Meeting, Beijing, China, R1-050246, 3$^{rd}$ Generation Partnership Project, Valbonne, France (Apr. 4-8, 2005).
"Evolved UTRA—Downlink transmission scheme," slides for discussion, 3GPP TSG RAN WG1 Meeting #40bis, Beijing, China, R1-050255, 3$^{rd}$ Generation Partnership Project, Valbonne, France (Apr. 4-8, 2005).
Sklar, "Digital Communications—Fundamentals and Applications," Prentice Hall (1988).
Newton, "Newton's Telecom Dictionary—The Official Dictionary of Telecommunications Networking and Internet," Harry Newton, CMP Books, New York, New York (2001).
"Digital cellular telecommunications system (Phase 2+); Multiplexing and multiple access on the radio path (GSM 05.02)," Version 5.1.0, European Telecommunications Standards Institute, Valbonne, France (Aug. 1996).
Gast, "802.11 Wireless Networks—The Definitive Guide," O'Reilly & Associates, Sebastopol, California (Apr. 2002).
"European digital cellular telecommunications system (phase 1 ); Mobile radio interface layer 3 specification," Recommendation GSM 04.08, Version 3.13.0, European Telecommunications Standards Institute, Valbonne, France (Feb. 1992).
"IEEE Standard for Local and metropolitan area networks—Part 16: Air Interface for Fixed Broadband Wireless Access Systems," IEEE Std. 802.16, Institute of Electrical and Electronics Engineers, New York, New York (2004).
"Proposal for the Downlink Multiple Access Scheme for E-UTRA," 3GPP TSG-RAN1 Meeting #40bis, Beijing, China, R1-050267, 3$^{rd}$ Generation Partnership Project, Valbonne, France (Apr. 4-8, 2005).
"Proposal of multiplexing methods and interference mitigation methods for downlink for evolved UTRAN," 3GPP TSG RAN WG1, Beijing, China, R1-050276, 3$^{rd}$ Generation Partnership Project, Valbonne, France (Apr. 4-8, 2005).
"Considerations for L TE DL Multiple Access," 3GPP TSG RAN WG1 Meeting #40 bis, Beijing, China, R1-050277, 3$^{rd}$ Generation Partnership Project, Valbonne, France (Apr. 4-8, 2005).
"Downlink Multiple Access for Evolved UTRA," TSG-RAN WG4#40Bis Meeting, Beijing, China, R1-050288, 3$^{rd}$ Generation Partnership Project, Valbonne, France (Apr. 4-8, 2005).
"Multiple Access Aspect of TDD L TE," 3GPP TWG RAN WG1 Meeting #41, Athens, Greece, R1-050403, 3$^{rd}$ Generation Partnership Project, Valbonne, France (May 9-13, 2005).
"Proposal for the Downlink Multiple Access Scheme for E-UTRA (Update)," 3GPP TSGRAN1 Meeting #41, Athens, Greece, R 1-050484, 3$^{rd}$ Generation Partnership Project, Valbonne, France (May 9-13, 2005).
Yaghoobi, "Scalable OFDMA Physical Layer in IEEE 802.16 WirelessMAN," Intel Technology Journal, vol. 8, Issue 3, Intel Corporation (2004).
Gast, "802.11® Wireless Networks; The Definitive Guide," pp. 198-213, O'Reilly & Associates, Sebastopol, California (Apr. 2002).
"802.16—IEEE Standard for Local and Metropolitan Area Networks; Part 16: Air Interface for Fixed Broadband Wireless Access Systems," Institute of Electrical and Electronics Engineers, New York, New York (Oct. 1, 2004).
"3$^{rd}$ Generation Partnership Project; Technical Specification Group GSM/EDGE Radio Access Network; General Packet Radio Service (GPRS); Overall description of the GPRS radio interface; Stage 2," 3GPP TS 03.64, V8.12.0, 3$^{rd}$ Generation Partnership Project, Valbonne, France (Apr. 2004).
Final Office Action in corresponding U.S. Appl. No. 11/955,895 (Oct. 6, 2011).
Office Action in corresponding U.S. Appl. No. 11/955,895 (Jun. 8, 2012).

(56) References Cited

OTHER PUBLICATIONS

"Digital cellular telecommunications system (Phase 2+); General Packet Radio Service (GPRS); Overall description of the GPRS radio interface; Stage 2 (3GPP TS 03.64 version 8.12.0 Release 1999)," ETSI TS 101 350, V8.12.0, European Telecommunications Standard Institute, Valbonne, France (Apr. 2004).

"$3^{rd}$ Generation Partnership Project; Technical Specification Group Radio Access Network; Physical Layer Aspects for Evolved UTRA (Release 7)," 3GPP TR 25.814, V0.1.0, $3^{rd}$ Generation Partnership Project, Valbonne, France (Jun. 2005).

\* cited by examiner

METHOD AND SYSTEM FOR ALLOCATING COMMUNICATION RESOURCES

CROSS-REFERENCE TO RELATED APPLICATIONS

This application is a continuation of U.S. patent application Ser. No. 13/920,760, filed Jun. 18, 2013, which is a continuation of U.S. patent application Ser. No. 11/955,895 (now U.S. Pat. No. 8,488,531 B2), filed Dec. 13, 2007, which is a continuation of International Patent Application No. PCT/CN2005/000857 filed on Jun. 15, 2005. The aforementioned patent applications are hereby incorporated by reference in their entireties.

TECHNICAL FIELD

The present invention relates to the field of radio communication systems, and in particular to a method and system for allocating communication resources, especially for packet-based, multi-user cellular communication systems.

BACKGROUND

In packet-based, multi-user cellular communication systems, such as multi-user OFDM (Orthogonal Frequency Division Multiplexing) systems, a scheduler-device that makes decisions as to which user is assigned which radio resources and when is typically employed. From time to time, users report the quality of their respective radio channels to the base station, whereupon the base station makes a scheduling decision. In uplink the base station measures the channel quality, e.g., from pilot signals transmitted by the users. The scheduler may exploit the fact that the users' channels change independently from each other, i.e., channels of one or more users may be fading, or, also, one or more channels allocated to a specific user may be fading, while others are not. Typically, a user is assigned radio resources when its channel conditions are good. Accordingly, the scheduler improves the performance of the system (in terms of cell throughput) as compared to systems that do not exploit the users' channel quality through a scheduler.

The extent to which the scheduler improves the system performance depends in downlink on the quality of the feedback information. Good, detailed and accurate feedback of the channel quality are necessary. There are situations, however, where such accurate and timely feedback is not possible. A user may, for instance, move at such a high speed that a channel quality measure is outdated and obsolete by the time it reaches the base station. Another example of unreliable feedback measures occurs when a cell-edge user has bad signal-to-noise ratio on the uplink feedback channel and the quality measure is simply detected erroneously at the base station.

Scheduling may also be inefficient if the channel varies considerably in time during a transmission time interval, i.e. in case of high Doppler spread. For certain types of data scheduling may not be desirable, e.g. for data with low latency requirements and low data rates. Feedback data is a typical example of such kind of data. In this case, dedicated channels are more appropriate.

For these situations, the system may provide a frequency-distributed channel in order to provide a high-diversity link-performance. Accordingly, users with reliable channel quality feedback and with data appropriate for scheduling are assigned radio resources when and where their respective channel conditions are known to be good, other users are assigned frequency-distributed channels.

A problem, however, is how to provide both high link-diversity (frequency-distributed) channels and high multiuser-diversity (frequency-localized) channels at the same time in an efficient way.

An attempt to solve this problem is disclosed in IEEE Std 802.16-2004, "Standard for Local and Metropolitan Area Networks", Part 16: "Air Interface for Fixed Broadband Wireless Access Systems", 2004, wherein the above problem has been solved through the use of so-called 'zones'. A zone is a time period during which a certain type of channel is transmitted. Each radio frame contains two zones, one for the transmission of frequency-localized channels followed by one for frequency distributed channels in a pure time-multiplexing fashion. In the header of each radio frame information is conveyed as to when in time one zone changes into the next.

A disadvantage with this solution, however, is that the link-diversity is limited.

Accordingly, there is a need for a system and method with improved link-diversity.

SUMMARY

Embodiments of the present invention provide a system and a method for allocating communication resources in a multi-user cellular communication system, which has an improved link-diversity as compared to the known prior art.

In accordance with the embodiments of the present invention, communication resources are divided in periods of time and frequency sub-bands, wherein part of the communication resources are used for frequency-localized communication channels, and part of the communication resources are used for frequency distributed channels. The method includes the steps of:
classifying part of said sub-bands as sub-bands carrying frequency-distributed channels, and
classifying part of said sub-bands as sub-bands carrying frequency-localized channels.

This has an advantage that frequency-localized communication and frequency-distributed communication can be performed simultaneously and without interruption, since the potential delay associated with each of the two channel types, imposed by the 'zone'-structure of the prior art, is eliminated. Further, since the present invention allows data to be transmitted continuously, the embodiments of the present invention have an advantage that link-diversity is improved because even if the signal quality is poor during part of a transmission frame, signal quality during the rest of the frame may be sufficient enough to ensure a correct transmission. Even further, the embodiments of the present invention have an advantage that there is no delay until the desired type of channel (localized or distributed) is available, since both types of channels always are available, which is a substantial advantage, in particular for packet data transmissions with demands for fast retransmissions.

After performing the classification of the frequency sub-bands, the classification may be changed from time period to time period, after a certain number of time intervals or at predetermined intervals. Which sub-bands are of which type can be transmitted on a broadcast channel in the beginning of, or prior to, a time period. This has the advantage that a distribution of frequency-localized and frequency-distributed communication resources which optimises system throughput always can be used.

A code representing a particular arrangement of the communication resources may be transmitted to the receiver, wherein the code may be used by the receiver to retrieve the communication resource scheme to be used. This has the advantage that rather complicated communication resource schemes may be communicated to the receivers without substantial signalling.

The classification of the frequency sub-bands may be kept from time period to time period. This has the advantage that the system may be standardized, i.e. the sub-bands may always be used for a specific kind of communication.

The frequency-distributed channels may consist of frequency hopping channels, time or code multiplexed channels, or interleaved frequency multiplexed channels. This has the advantage that link-diversity of the frequency-distributed channels may be increased even further.

The embodiments of the present invention also relate to a transmitter and a multi-user communication system.

Further advantages and features of the embodiments of the present invention will be disclosed in the following detailed description.

DETAILED DESCRIPTION OF EMBODIMENTS

As described above, communication in a packet-based multi-user communication system can be performed using frequency-localized channels, i.e. channels which are assigned to users based on channel quality measurements. As also is stated above, in certain situations, such as when a channel quality measure is outdated and obsolete by the time it reaches the base station due to a fast moving user, or when communicating data with low latency requirements and low data rates, frequency-localized communication may be undesirable. In such cases, communication using frequency-distributed channels may be preferable.

Accordingly, there is a need for a system utilizing both types of communication.

When using frequency-localized and frequency-distributed channels, the channels must be complementary (i.e., they must use disjoint resources) and yet as many of the physical radio resources as possible must be assigned to users (resources must not be unused).

Figure 1:
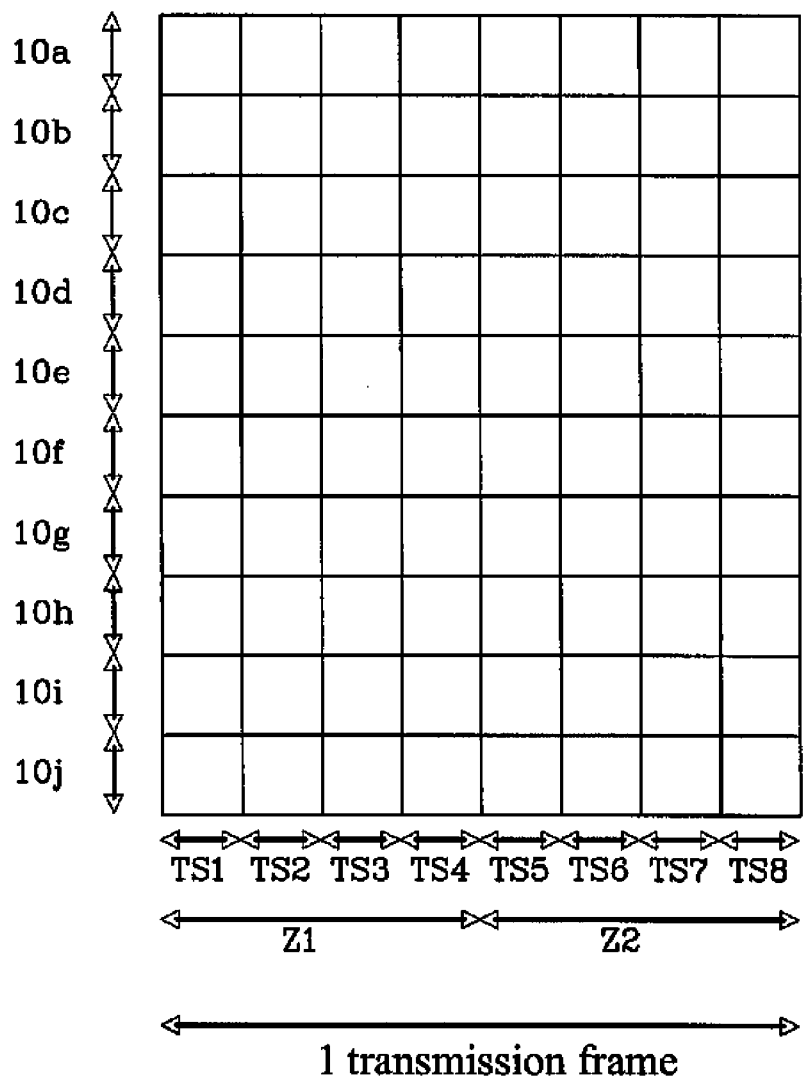
FIG. 1 shows a prior art method of transmitting frequency-localised and frequency-distributed communication.

FIG. 1 shows a prior art solution. As can be seen in the figure, the frequency band is divided into sub-bands 10a-10j, each consisting of a number of sub-carriers (not shown). Further, the allocation of the sub-bands are divided into transmission frames, of which one is shown, each consisting of a certain period of time, divided into time slots TS1-TS8, which in turn are divided into a number of symbols. When it is desired to have both frequency-localized and frequency-distributed communication, each frame is divided into two zones, of which the first zone Z1 is used for the frequency-localized channels followed by a second zone Z2 for frequency distributed channels in a pure time-multiplexing fashion. As stated above, information as to when one zone changes into the next is conveyed in the header of each radio frame. As stated above, a disadvantage with this solution is that frequency-localized communication and frequency-distributed communication cannot be performed simultaneously. Further, a delay associated with each of the two channel types is imposed by the 'zone'-structure. Even further, time diversity of the frequency distributed channels, is degraded since these channels are limited to only one of the zones Z1, Z2.

Figure 2:
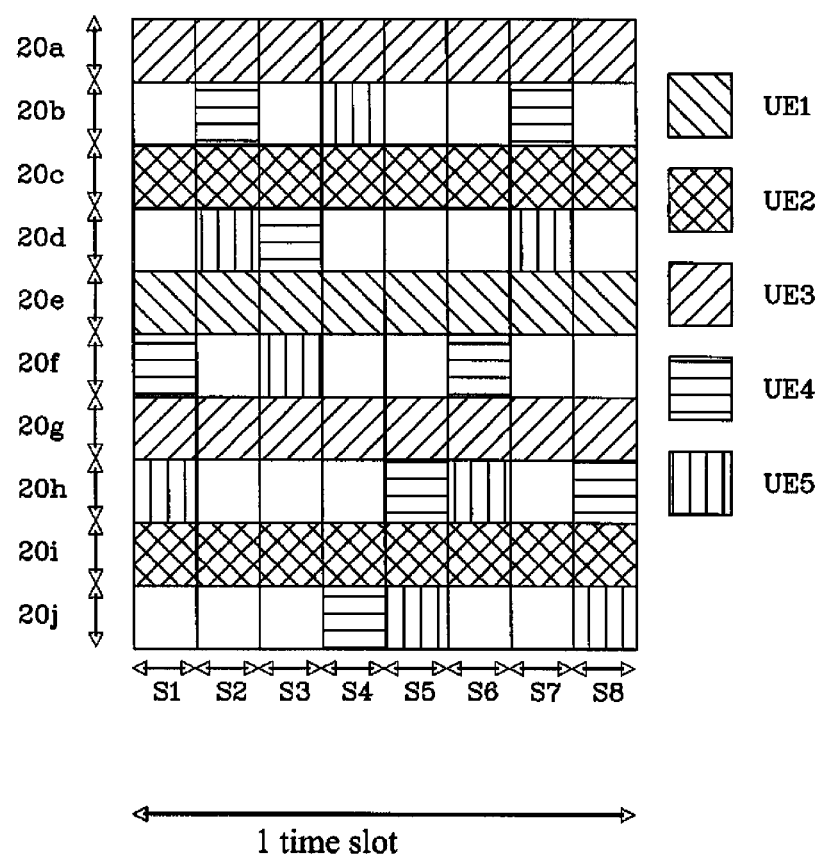
FIG. 2 shows a communication resource scheme suitable for use with the embodiments of the present invention.

In FIG. 2 is shown a communication resource scheme suitable for use with the embodiments of the present invention. The disclosed system is a multiple-carrier OFDM system, having a two-dimensional structure (time and frequency). The frequency spectrum of the OFDM system is divided into ten sub-bands 20a-20j, preferably constituting equal portions of the frequency spectrum. Equal frequency sub-bands are preferred to facilitate resource management (for example, it is easier to allocate the available resources). However, division into non-equal frequency sub-bands is, of course, also possible. Each sub-band is divided into a number of sub-carriers, for example, each sub-band may consist of 20 sub-carriers (not shown), however, sub-bands consisting of any number of sub-carriers are possible, e.g., 1, 5, 100 or any other number.

In the time domain, the frequency spectrum is divided into time-slots, which typically has the length of a number of OFDM symbols. The figure shows one time slot consisting of eight OFDM symbols S1-S8. The frequency/time spectrum thus constitutes a communication resource scheme, wherein, the smallest resource allocated to a user is one sub-band during one OFDM symbol (for frequency-distributed communication, as will be described below).

Instead of, as in the prior art, divide a transmission frame in different time zones, which are used for frequency-localized and frequency-distributed communication, respectively, the communication resource scheme is divided in frequency.

In this exemplary embodiment, the sub-bands 20a, 20c, 20e, 20g, 20i are used for frequency-localized communication, while the sub-bands 20b, 20d, 20f, 20h, 20j are used for frequency-distributed communication. Further, as can be seen in the figure, there are three users UE1-UE3 communicating on the frequency-localized channels (UE1 on sub-band 20e; UE2 on 20c and 20i; and UE3 on 20a and 20g), and two users UE4, UE5 communicating on the frequency-distributed channels. Accordingly, the embodiments of the present invention allow that all users may benefit from continuous data transmission, irrespective of which type of communication that is utilized. Further, the continuous transmission has the advantage that data transmission using frequency-distributed channels are spread all over time slot and thus also all over a frame, and not just part of it, which improves time diversity of the channel. Further, the embodiments of the present invention have an advantage that it increases the throughput in the system, since, for example, frequency-localised communication can always be performed, which, in turn, allows communication with users when they have a good channel quality, irrespective of when in, e.g., a transmission frame.

In use, a scheduler is used to multiplex the frequency-localized channels onto sub-bands determined to be used for frequency-localized channels, and frequency-distributed channels are multiplexed onto sub-bands to be used for frequency-distributed channels.

As is obvious to a person skilled in the art, any arrangement of the frequency-localized and frequency distributed channels may be used. In the example shown in FIG. 1, each type of communication is allocated half the resources. As is obvious to a person skilled in the art, however, the distribution of frequency-localized and frequency distributed channels is arbitrary, as long as at least one sub-band is used for either of the two types of communication. For example, if traffic in the cell varies in time, the channel distribution may vary in time as well. Preferably, however, the channel distribution is not changed too rapidly, i.e. a number of frames in a row utilize the same distribution, as this substantially reduces signalling in the system. The base station may transmit, on a broadcast channel, which sub-bands are of which type, e.g. each time slot or each time there is a change in channel distribution. As is common in a system utilizing frequency localized channels, a scheduler makes decisions as to which user is assigned which frequency localized channels, whereupon this information is fed forward over a control channel to the users. Also, data regarding which user is assigned which frequency-distributed channels is communicated.

Data transmission on the frequency distributed channels may use various techniques for increasing diversity further. For example, as is shown in FIG. 2 for users UE4 and UE5, frequency hopping may be utilized. In this case, the base station and the users employ an algorithm to obtain the particular frequency hopping sequence for a frequency hopping channel. Further, a user may be allocated two or more sub-bands for frequency-distributed communication.

Even further, in one embodiment of the present invention, there are one or more predefined channel resource schemes programmed in the base station and the receivers. In this way, the base station can transmit a code representing which scheme to use, e.g. on a broadcast channel, whereupon the receiver can use a look-up table to obtain the channel arrangement of the particular scheme. Each time the channel resource scheme is changed, the base station transmits the code representing the new scheme. This has an advantage that this kind of signalling is kept to a minimum. In an alternative embodiment, the base station may signal which frequency sub-bands that are to be used for which kind of signalling. This may be effected, e.g., at predetermined intervals, and/or each time the category (frequency localized or frequency distributed) of a sub-band is changed. As an even further alternative, the communication system standard may comprise only one configuration, which, accordingly always is used and thus has the advantage that no signalling regarding the communication resource scheme arrangement is necessary.

The use of frequency hopping algorithms may, as disclosed above, be limited to those sub-bands that are used for frequency-distributed channels. However, in a system consisting of a plurality of base stations, it is often preferred to utilize frequency hopping patterns that in some way are optimised regarding to inter base station interference. If the employed frequency hopping patterns are generated based on the particular channel distribution of the base station, the frequency hopping patterns of neighbouring base stations, which utilizes different channel distributions, may disturb each other. Therefore, as is shown in the exemplary embodiment in FIG. 3, the frequency hopping algorithm may be generic in the sense that it applies to any classification of the sub-bands, however with the restriction that sub-bands for frequency localized channels may not be part of the generated hopping sequence, hence these bands are eliminated from the hopping patterns in case the generating algorithm makes them appear in the hopping sequence.

Figure 3:
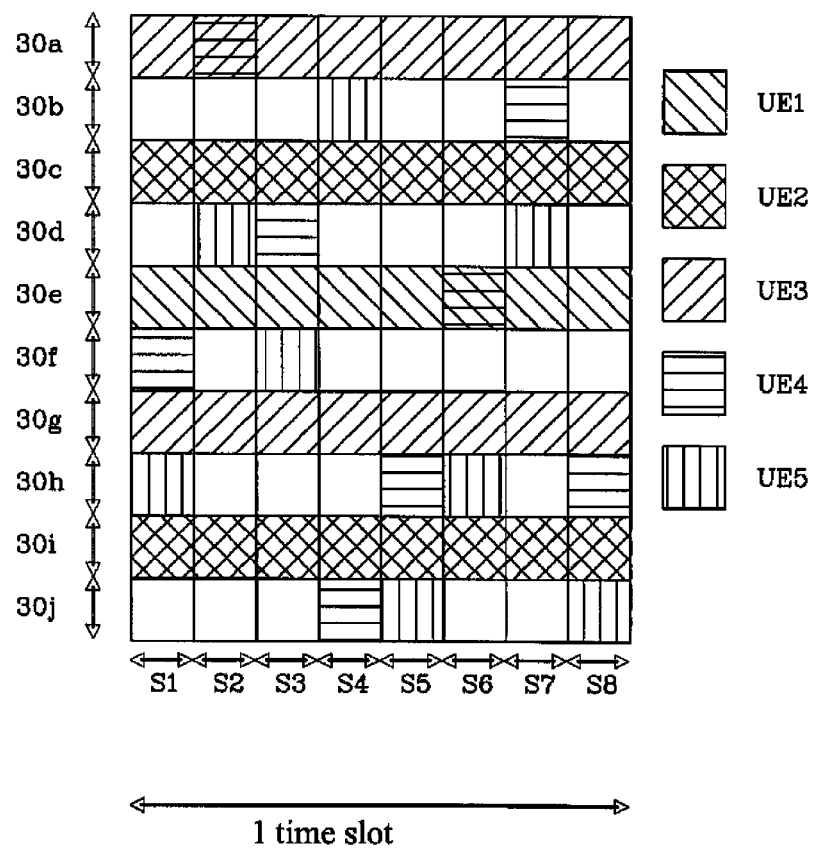
FIG. 3 shows an exemplary embodiment of the present invention.

Generic frequency-hopping sequences have the following advantages. It prioritizes the allocation of non-hopping (localized) channels, which heavily depends on the channel quality, allowing arbitrary allocation of the localized channels based on channel quality. Moreover, hopping patterns that are designed for limited mutual interference can be used without any modification, and with actual improvement of the inter-cell interference between the hopping patterns. This is illustrated in FIG. 3, wherein the hopping pattern for UE4 indicates that in TS2, sub-band 30a should be used, and in TS6, sub-band 30e should be used. In these time slots, however, according to the embodiments of the present invention, no data for UE4 is transmitted, but instead the frequency-localized data for UE3 in TS2, and UE1 in TS 6, is prioritised.

This solution has the advantage that it reduces the downlink signalling, since the same frequency hopping patterns may be utilized irrespective of which channel distribution is utilized. Further, the balance between the needs for frequency-distributed channels and frequency-localized channels can vary between cells and, in a certain cell, over time. It is therefore desirable that different cells can employ different multiplexing configurations in order to efficiently serve the present users. For the same efficiency reason, it is desirable that the multiplexing configuration in a cell can change over time.

Figure 4:
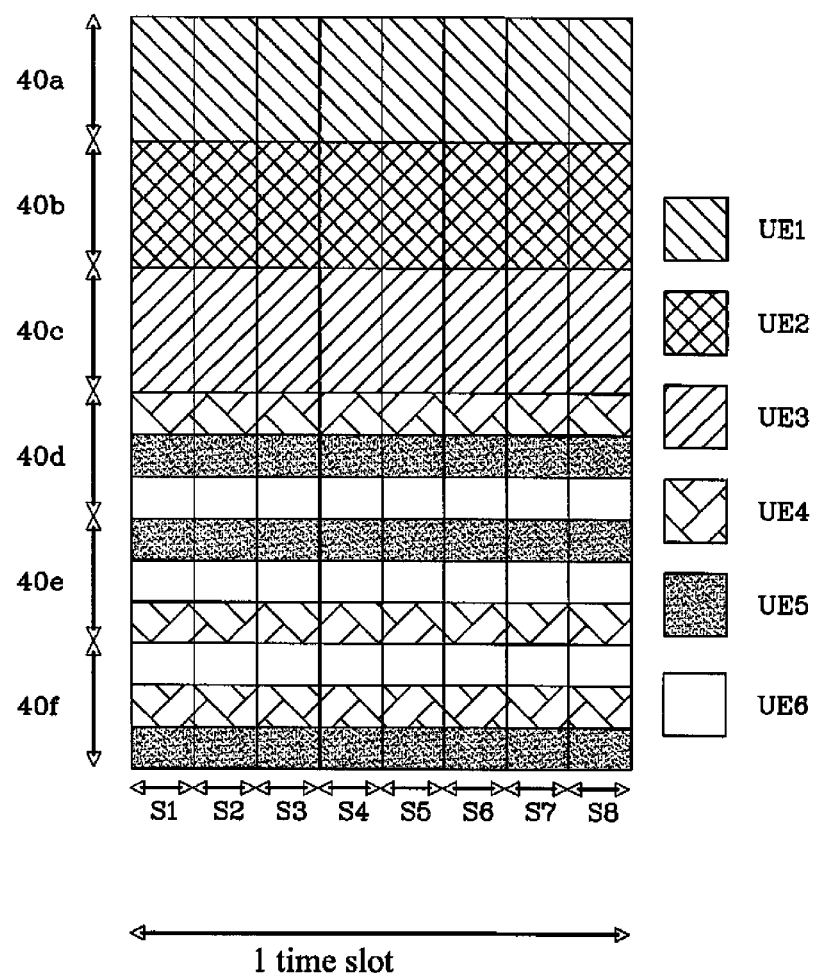
FIG. 4 shows another exemplary embodiment of the present invention.

FIG. 4 shows a further exemplary embodiment of the present invention. Here, the upper three sub-bands 40a-c are used for frequency-localized channels, while the lower three sub-bands 40d-f are used for frequency-distributed channels. In this embodiment, however, no frequency hopping is used, instead channel diversity is accomplished using interleaved frequency multiplexing, i.e., users UE4-UE6 each are allocated channels in each of the sub-bands 40d-f, i.e. each of the uses are allocated one or more sub-carriers in a sub-band. Further ways (not shown) to accomplish channel diversity includes time multiplexing and code multiplexing.

What is claimed is:

1. A method of performing multiple-carrier orthogonal frequency division multiplexing (OFDM), further comprising:
   multiplexing frequency localized channels onto a first plurality of sub-bands determined to be used for the frequency localized channels, and
   multiplexing frequency distributed channels onto a different second plurality of the sub-bands to be used for the frequency distributed channels, wherein each of the frequency distributed channels is multiplexed onto the second plurality of sub-bands according to a respective frequency hopping pattern; wherein
   the first plurality of the sub-bands for the frequency localized channels are not part of a generated hopping sequence in a frequency to be transmitted, wherein the frequency localized channels are assigned to users based on channel quality measurements.

2. The method of claim 1, wherein each sub-band comprises of multiple sub-carriers.

3. The method of claim 2, wherein a signal in the OFDM system is transmitted in a time-slot.

4. The method of claim 3, wherein the time-slot comprises a length of a number of OFDM symbols, wherein one OFDM symbol is a smallest resource that is to be allocated to a user.

5. The method of claim 1, wherein a scheduler is used to multiplex the frequency localized channels onto the first plurality of the sub-bands which are determined to be used for the frequency localized channels, and to multiplex the frequency distributed channels onto the second part of the multiple sub-bands which are determined to be used for the frequency distributed channels.

6. The method of claim 5, wherein transmitting of the sub-bands is performed by at least one of a base station or a user equipment (UE).

7. A communication system that performs multiple-carrier orthogonal frequency division multiplexing (OFDM), the system comprising: a processor programmed to multiplex frequency localized channels onto a first plurality of sub-bands determined to be used for the frequency localized channels and multiplex frequency distributed channels onto a different second plurality of the sub-bands to be used for the frequency distributed channels, wherein each of the frequency distributed channels is multiplexed onto the second plurality of sub-bands according to a respective frequency hopping pattern; and the first plurality of the sub-bands for the frequency localized channels are not part of a generated hopping sequence in a frequency to be transmitted, wherein the frequency-localized channels are assigned to users based on channel quality measurements.

8. The communication system of claim 7, wherein each sub-band comprises of multiple sub-carriers.

9. The communication system of claim 8, wherein a signal in the OFDM system is transmitted in a time-slot.

10. The communication system of claim 9, wherein the time-slot comprises a length of a number of OFDM symbols, wherein one OFDM symbol is a smallest resource that is to be allocated to a user.

11. The communication system of claim 7, wherein a scheduler is used to multiplex the frequency localized channels onto the first plurality of the sub-bands which are determined to be used for the frequency localized channels, and to multiplex the frequency distributed channels onto the second plurality of the sub-bands which are determined to be used for the frequency distributed channels.

12. A base station in a multiple-carrier orthogonal frequency division multiplexing (OFDM) system, the base station comprising:

a transmitter to transmit an indication representing a type of communication resource scheme used in the OFDM system for frequency localized channels and frequency distributed channels; and a processor programmed to use time domain and frequency spectrum, divide the frequency spectrum into multiple sub-bands, and multiplex the frequency localized channels onto a first plurality of sub-bands determined to be used for the frequency localized channels and multiplex the frequency distributed channels onto a different second plurality of the sub-bands to be used for the frequency distributed channels, wherein each of frequency distributed channels is multiplexed onto the second plurality of sub-bands according to a respective frequency hopping pattern; wherein the first plurality of the sub-bands for the frequency localized channels are not part of a generated hopping sequence in a frequency to be transmitted, wherein the frequency localized channels are assigned to users based on channel quality measurements.

13. The base station of claim 12, wherein the base station transmits the indication representing a new resource scheme each time that the type of the communication resource scheme is changed.

14. The base station of claim 12, wherein a frequency hopping sequence is generated based on channel distribution of the base station.

15. The base station of claim 14, wherein the frequency hopping sequence is limited to the second plurality of the multiple sub-bands that are used for the frequency distributed channels.

16. A method of carrying out a communication resource scheme in a multiple-carrier orthogonal frequency division multiplexing (OFDM) system, the method comprising:

balancing demands for frequency localized channels and frequency distributed channels to serve a plurality of users, wherein a plurality of resources in a frequency is divided for both the frequency localized channels and the frequency distributed channels, the OFDM system has a two-dimensional of time domain and frequency spectrum, the frequency spectrum is divided into multiple sub-bands with a first plurality of the sub-bands used for the frequency localized channels and a different second plurality of the sub-bands used for the frequency distributed channels, wherein each of the frequency distributed channels is multiplexed onto the second plurality of the sub-bands according to a respective frequency hopping pattern; and the first plurality of the sub-bands for frequency localized channels are not part of a generated hopping sequence in a frequency to be transmitted, wherein the frequency-localized channels are assigned to the plurality of users based on channel quality measurements.

17. The method of claim 16, wherein a signal in the OFDM system is transmitted in a time-slot.

18. The method of claim 17, wherein each time-slot comprises a length of a number of OFDM symbols, wherein one OFDM symbol is a smallest resource that is to be allocated to a user.

19. The method of claim 16, wherein a scheduler is used to multiplex the frequency localized channels onto the first plurality of the sub-bands which are determined to be used for the frequency localized channels, and to multiplex the frequency distributed channels onto the second plurality of the sub-bands which are determined to be used for the frequency distributed channels.

* * * * *